US011386932B2

(12) United States Patent
Gilson et al.

(10) Patent No.: US 11,386,932 B2
(45) Date of Patent: *Jul. 12, 2022

(54) AUDIO MODIFICATION FOR ADJUSTABLE PLAYBACK RATE

(71) Applicant: Comcast Cable Communications, LLC, Philadelphia, PA (US)

(72) Inventors: Ross Gilson, Philadelphia, PA (US); John Hart, Philadelphia, PA (US); Mark Francisco, Clarksburg, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/171,772

(22) Filed: Feb. 9, 2021

(65) Prior Publication Data

US 2021/0343314 A1   Nov. 4, 2021

Related U.S. Application Data

(63) Continuation of application No. 16/561,355, filed on Sep. 5, 2019, now Pat. No. 10,950,270, which is a continuation of application No. 15/293,560, filed on Oct. 14, 2016, now Pat. No. 10,446,187, which is a continuation of application No. 14/279,903, filed on May 16, 2014, now Pat. No. 9,496,000.

(51) Int. Cl.
*H04N 5/783*  (2006.01)
*G11B 27/00*  (2006.01)
*G11B 27/036*  (2006.01)
*G11B 27/19*   (2006.01)
*G10L 21/055*  (2013.01)
*H04N 5/93*    (2006.01)

(52) U.S. Cl.
CPC .......... *G11B 27/005* (2013.01); *G10L 21/055* (2013.01); *G11B 27/036* (2013.01); *G11B 27/19* (2013.01)

(58) Field of Classification Search
CPC ..... G10L 21/055; G11B 27/005; G11B 27/19; G11B 27/036
USPC ................................ 386/343, 326, 353, 224
See application file for complete search history.

(56) References Cited

U.S. PATENT DOCUMENTS

| 8,103,511 B2 | 1/2012 | Basson et al. |
| 2004/0103429 A1 | 5/2004 | Carlucci et al. |
| 2006/0221788 A1* | 10/2006 | Lindahl ................. G10L 21/04 369/47.15 |
| 2006/0245732 A1 | 11/2006 | Lassure et al. |
| 2007/0182864 A1 | 8/2007 | Stoneham et al. |

(Continued)

*Primary Examiner* — Robert Chevalier
(74) *Attorney, Agent, or Firm* — Banner & Witcoff, Ltd.

(57) ABSTRACT

Features described herein relate to providing the capability to playback audiovisual content in a comprehensible manner at a rate adjustable by the viewer. For example, if a viewer wishes to watch a one hour news program, but the viewer only has thirty minutes to view the program, playback of the program at twice the rate, but in a comprehensible manner is provided. To provide the playback of the video at the adjustable rate, substitute audio is generated by adding or removing audio content without changing the playback rate of the audio. The video at the adjusted playback rate and the substitute audio at the normal playback rate may have the same duration and in some embodiments, may be presented synchronously.

26 Claims, 7 Drawing Sheets

(56) References Cited

U.S. PATENT DOCUMENTS

2013/0120662 A1   5/2013   Houdaille et al.
2015/0229975 A1   8/2015   Shaw et al.
2016/0173942 A1   6/2016   Ransom et al.

* cited by examiner

AUDIO MODIFICATION FOR ADJUSTABLE PLAYBACK RATE

CROSS-REFERENCE TO RELATED APPLICATIONS

This application is a continuation of U.S. application Ser. No. 16/561,355 filed on Sep. 5, 2019, which is a continuation of U.S. application Ser. No. 15/293,560, filed Oct. 14, 2016, now U.S. Pat. No. 10,446,187, which is a continuation of U.S. application Ser. No. 14/279,903, filed May 16, 2014, now U.S. Pat. No. 9,496,000.

BACKGROUND

Trick play (or trick mode) features allow for operations such as forward and reverse play at multiple rates. Such features may be provided by skipping or duplicating frames of a video, or by adjusting the playback frame rate. For example, in fast-forward and fast-reverse at a 2× rate, a system may provide the appearance of playing the video at double rate (forwards or backwards) by skipping playback of every other frame (e.g., the frames are displayed at the same rate, but only half the frames are presented), or by presenting every frame at twice the playback rate. Similarly, slow-forward and slow-reverse at a ½ rate provides the appearance of playing the video at half rate by displaying every frame twice (e.g., the frames are displayed at the same rate, but twice the frames are presented), by generating new frames in between the original frames, or by presenting every frame at half the playback rate. For skip-forward and skip-reverse, the system simply skips display of a duration of the video timeline (i.e., skips a predetermined number of frames) before returning to normal playback.

These and other trick play features provide the viewer a search capability to advance or reverse the playback timeline of the content to a point where the viewer would like to begin or resume watching the content at a normal playback rate (e.g., skipping a commercial). The trick play features, however, substantially limit and may entirely eliminate the viewer's ability to experience as intended (e.g., comprehend) the content during use of these trick play features. For one, the audio that is synchronized to the video may not have an analogous capability to simply skip (or duplicate) a slice of the audio corresponding to the skipped or duplicated frames. Were this to occur, the audio would become incomprehensible. For this reason, playback of the audio is often suspended during trick play.

To provide a viewer a better experience, there remains a need to be able to present audiovisual content at an adjustable rate desired by the viewer, but in a manner that remains comprehensible.

SUMMARY

The following summary is for illustrative purposes only, and is not intended to limit or constrain the detailed description.

Features herein relate to providing the capability to playback audio/visual content in a comprehensible manner at a rate adjustable by the viewer and/or provider. For example, if a viewer wishes to watch a one hour news program, but the viewer only has thirty minutes to view the program, playback of the program at twice the rate, but in a comprehensible manner is provided in accordance with one aspect. As another aspect, a capability is provided for the content provider to present a commercial or other item in an abbreviated manner if a viewer wishes to skip the commercial.

To provide the playback at the adjustable rate, some features relate to generating substitute audio for replacing the original audio or altering the original audio in the audiovisual content. When the playback rate of the video in the audiovisual content is adjusted above or below the normal playback rate of the audiovisual content, the substitute audio is contemporaneously presented at the normal playback rate of the audiovisual content. The video at the adjusted/modified playback rate and the substitute audio at the normal playback rate may have the same duration and in some embodiments, may be presented synchronously.

To generate substitute audio in one aspect, audio content is added or removed without changing the playback rate. As such, the audio is still comprehensible, but the duration is adjusted to that of the video at the adjusted playback rate. Different algorithms may be applied to alter the original audio or generate the substitute audio depending, for example, on the magnitude of the playback rate adjustment and/or based on the complexity of video and or original audio.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Audiovisual content may include an output rate and a playback rate. Output rate may refer, for example, to a rate at which data/frames (not necessarily all of the frames) of a video or audio are displayed/presented, streamed, or output to a device. Examples of output rate include a rate at which a device displays frames of a video or presents audio, a rate at which a server streams video frames or audio data to a device, a rate at which a memory buffer outputs video frames or audio data, etc.

Playback rate, on the other hand, may refer to a rate at which content within the video frames or audio are displayed/presented, streamed, or output to a device. The distinction between output rate and playback rate is described with respect to FIG. 1, which illustrates various examples of prior art audiovisual content that include video synchronized with audio.

Figure 1:
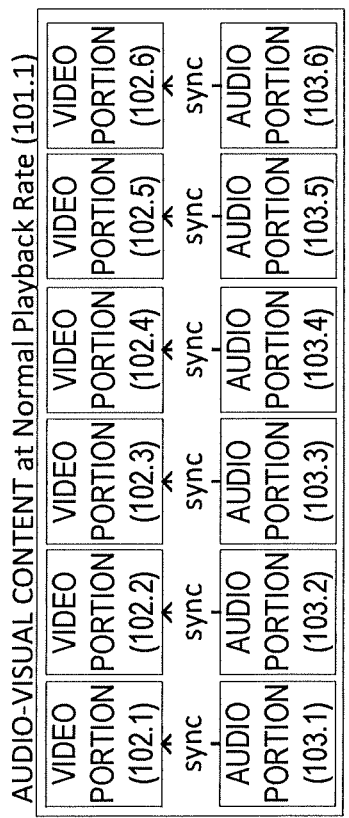
FIG. 1 illustrates prior art audio-visual content at various playback rates.
Figure 1:
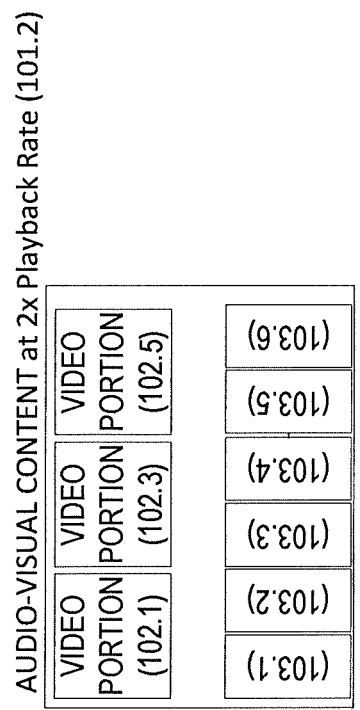

As shown in audiovisual content 101.1, 101.2, and 101.3 of FIG. 1, the video is made up of a sequence of video portions 102.1 through 102.6 (e.g., video frames) that are output (e.g. presented, displayed, streamed, etc.) in sequence at a predetermined output rate (e.g., a frame rate of 30 frames per second). If all of the video portions of the audiovisual content are output in a forward sequence as in 101.1, the playback rate (e.g., the rate at which the content in the video is presented) is the same as the output rate (e.g., the rate at which the frames are presented). If, however, every other video portion of the audiovisual content are output in a forward sequence as in 101.2, and the frames are presented at the same predetermined output rate as in 101.1, the content in the video frames will appear at twice the output rate, and thus the video in 101.2 will have a playback rate that is twice the output rate.

Audiovisual content 101.1 may include video having a normal playback rate, such that the content of the video frames are presented, for example, at the same rate at which the live-action in the video is recorded on the frames, or in which the video is otherwise intended to be displayed under normal viewing conditions (e.g. a rate at which a cartoon video is designed to be viewed).

A duration or playback time of the video, or portion thereof, is equal to the output rate multiplied by the number of video portions that are played back. For example, the playback time of the entire audiovisual content 101.1, including six video frames at a normal output rate of 30 frames per second, would be ⅕ of a second.

Audiovisual content may include audio that is synchronized to the video. For example audiovisual content 101.1, includes audio made up of six audio portions 103.1 through 103.6. While displayed as discrete portions, the audio may include a continuous sequence of data representing audio of the same duration as the entire video (e.g. 102.1 through 102.6). The audio is displayed in FIG. 1 as discrete portions (or durations) to show that each duration is synchronized to one of the video portions.

As described above, audiovisual content may be played back at rates other than the normal playback rate. For example, a video-on-demand system, digital video recorder, set top box, or other computing device may include trick play or trick mode features such as forward and reverse play at multiple rates (e.g., 2×, 4×, ½×, ¼×, −2×, −4×, −½×, −¼×) and forward and reverse skip play (e.g., jump 30 seconds forward or backwards in time) at multiple durations. In prior analog systems (e.g. VHS) the audiovisual content could be played back faster or slower simply by running the medium (e.g. videocassette) faster or slower across the pickup head of the player, thereby changing the output rate of the frames and playback rate of the content faster or slower. In digital content, however, trick play is can be accomplished by a number of methods. For example, as discussed above, a client (e.g., a set top box), may skip frames of a video (e.g., fetch ever other frame of a video stream) and output those frames at the same output rate as in the normal playback rate situation. For example, to double the playback rate (e.g. 2×) as in audiovisual content 101.2, every other video portion (e.g., 102.1, 102.3, and 102.5) are played back in sequence at the same output rate as in audiovisual content 101.1. This results in the content of the video appearing to be played back at double the rate, when in actuality; only half the content is presented.

Several other examples of trick play including a modified playback rate include a client fetching and presenting only intra-coded frames (e.g., MPEG-4 I-frames) to play back at a fast-forward or fast reverse playback rate, a client fetching and presenting all frames of a video at a faster or slower output rate resulting faster or slower playback rates, a server delivering an alternate video having a normal frame output rate but with the content (e.g., imagery) in the frames recorded or encoded in the frames at twice the playback rate (e.g., a 2× stream), a server flooding a client decoder at twice/half the output rate, etc.

Adjusting the playback rate in these manners, e.g., by skipping or duplicating video portions, present problems for playing back the audio that is intended to be synchronized with the video, because the audio portions cannot likewise be skipped, or duplicated, or appropriately modified at the playback rate and still maintain comprehensibility. Instead, they must be compressed or expanded in time. That is, all of the portions of the audio are output, but the output rate of the audio rate is adjusted. For example in audiovisual content 101.2 (e.g., a 2× fast-forward playback), every other video portion is played, but all audio portions are played, so each audio portion must be compressed in time to half its original duration, so that the total duration the audio is the same as a reduced number of video portions presented in the 2× play. This would result in playing back the audio portions 103.1 and 103.2 at twice the speed, and in a distorted, high-pitch.

Under such conditions, while having a common playback rate, the video and audio have different output rates (e.g., the video at the normal output rate and the audio at the modified output rate). The result may be a loss of audio synchronization (e.g., lip synchronization) to the video. Further, the faster the audiovisual content is played back the more incomprehensible the audio becomes. For example, as the audio is compressed in time, the pitch of the audio increases respectively, and words can blend to the point that variations in tone and inflection and overall enunciation of the words are not discernible. For this reason, many playback systems do not output the audio when the audiovisual content is played back at a rate other than the normal playback rate. To address these problems, various embodiments presented below replace the audio portions with substitute audio during playback of audiovisual content at playback rates other than the normal playback rate.

Figure 2A:
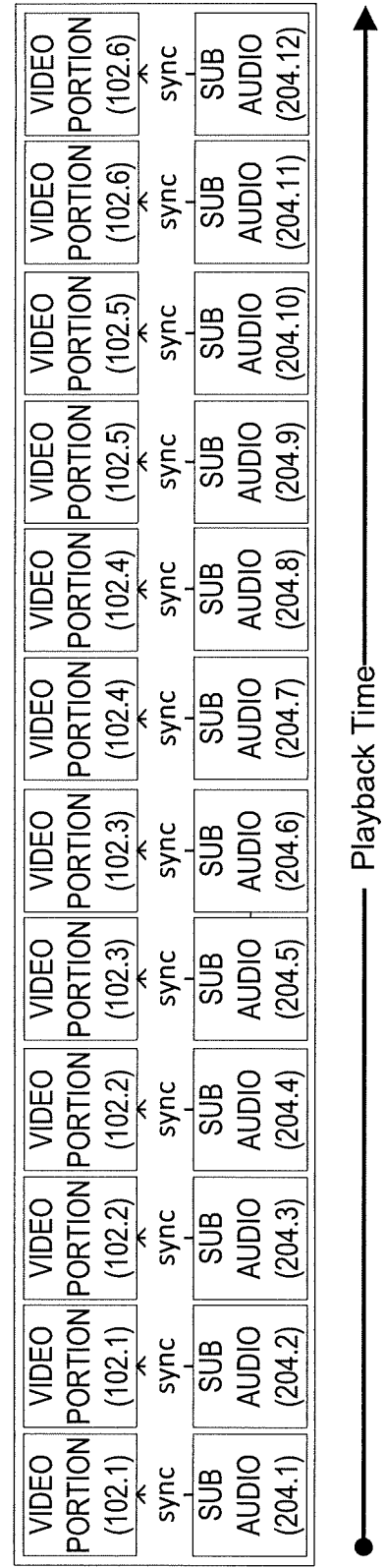
FIGS. 2A and 2B illustrate modified audio-visual content at various playback rates according to one or more embodiments.
Figure 2B:
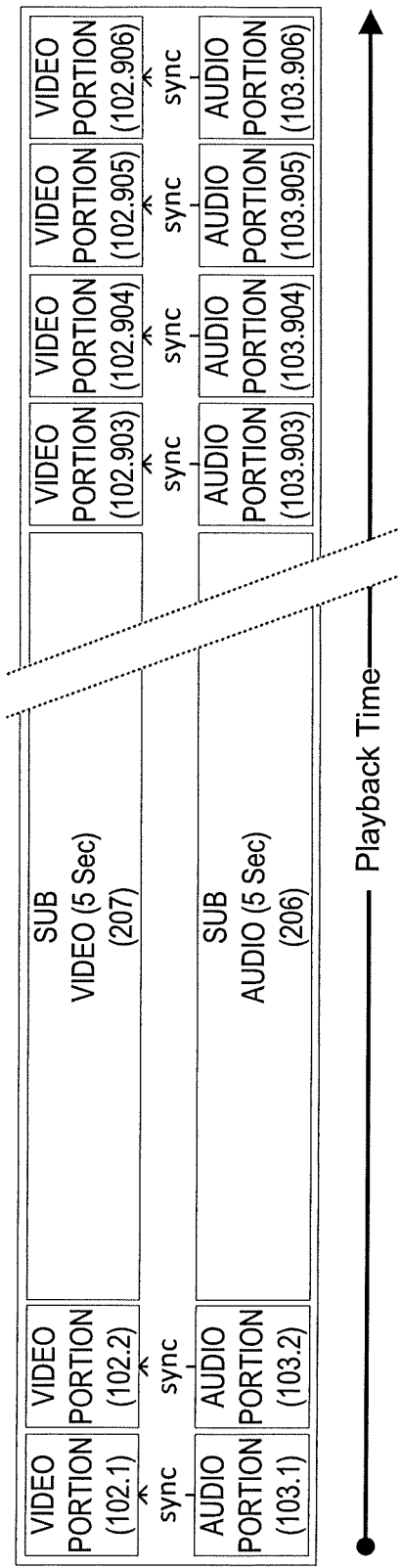

FIGS. 2A and 2B illustrate various embodiments of audiovisual content including substitute audio in place of the original audio portions (e.g., 103.1 through 103.6). In each of these examples the output rate of the video is the same as in FIG. 1 (e.g., the normal output rate), with the playback rate adjusted by reducing or increasing the number of video portions of the audiovisual content that are presented. Unlike the audio in FIG. 1, however, the substitute audio in FIGS. 2A and 2B have the same playback rate as that of the video (e.g., the normal playback rate). In various examples, the substitute audio is generated from the original audio in the audiovisual content, but with some of the content removed or additional content added to account for the reduction or addition in playback time at the off-normal rates.

For example, if the video portion 102.1-102.6 contains a video scene of two actors having a conversation, the substitute audio may contain an alternative audio recording of two actors having an abbreviated (or extended) conversation. As further described below, the actors in the abbreviated audio may skip unnecessary words, shorten pauses between words, and may speak alternative dialogue so that the meaning of the conversation is preserved but the conversation takes half the time. Similarly, an extended version of the audio may have the actors speaking their normal lines of dialogue, but with longer pauses between spoken words or sentences, or the actors may speak extra lines of dialogue, so that the same conversation takes twice as long.

Audiovisual content 201.1 in FIG. 2A illustrates one embodiment with the video at the 2× playback rate and substitute audio at the 1× playback rate. The result is audiovisual content with video that appears to be presented twice as fast but with audio that may be synchronized to the video that sounds as if it is presented in a comprehensible normal fashion. In audiovisual content 201.1 original audio portions 103.1 through 103.6 are replaced with substitute audio 203.1 through 203.3. Substitute audio 203.1 may be presented contemporaneously with video portion 102.1, substitute audio 203.2 may be presented contemporaneously with video portion 102.3, and substitute audio 203.3 may be presented contemporaneously with video portion 102.5.

Audiovisual content 201.2 in FIG. 2A illustrates another embodiment with a video at a ½× playback rate with substitute audio at the 1× playback rate. In this embodiment, original audio portions 103.1 through 103.6 are replaced with substitute audio portions 204.1 through 204.12, which are respectively presented contemporaneously with the 12 video portions (e.g., video portions 102.1 through 102.6 each presented twice).

Audiovisual content 201.3 in FIG. 2B illustrates another embodiment with the video at a negative 1× (e.g., 1× speed rewind) playback rate with the substitute audio at a 1× playback rate. In this embodiment the video portions are presented in reverse order sequence, while the substitute audio is presented in a forward order. Original audio portions 103.6 through 103.1 (each individually presented in the backwards direction as well as in backwards order) are replaced with substitute audio 205.1 through 205.6 (each presented in the forwards direction in forward order), respectively. As one example, the audio portion 205.1 may be the same as 103.6 played at a forward 1× rate, 205.2 may be the same as 103.5 played at a forward 1× rate, etc. In another example, 103.1-103.6 may include a sequence of spoken sentences, which are partitioned at the boundary of each sentence, and sequence of the sentence rearranged in reverse order, but still played in the forward direction to create 205.1-205.6. Audiovisual content 201.4 in FIG. 2B illustrates another embodiment with the video having a thirty second video skip rate (e.g., played back at the normal playback rate with 30 seconds of the video skipped) with substitute audio 206 at a 1× playback rate replacing the original audio portions 103.3 through 103.902 that were previously synchronized to the skipped video portions. In audiovisual content 201.4, having for example a 30 frames per second output rate, video portion 102.903 is presented subsequent to video portion 102.2, skipping video portions 102.3 through 102.902 (e.g. 900 frames representing 30 seconds of video).

During a playback duration that is shorter (e.g., 5 seconds) than the duration of the skipped content (e.g., 30 seconds), substitute audio 206 may be inserted at a 1× playback rate. During this inserted shorter duration, no video may be played back, a previous video portion (e.g., 102.2) may be repeatedly played back, a substitute video portion 207 (e.g., a still image, alternate video sequence) may be played back, or a combination of these may be used. The substitute audio 206, may include a spoken summary of the skipped portion, audio synchronized to a substitute video portion, or any other audio having a length within the shortened duration. In some variations to audiovisual content 201.4, during the shortened duration of the skipped video, a user may select to return to the original video and audio at the original (e.g., normal) playback rate or a different modified playback rate. In response the selection, presentation or outputting of the audio visual content may return to the beginning of the skipped portion (e.g., video portion 102.3 and audio portion 103.3), to an audio and video portion prior to the skipped portions (e.g., video portion 102.1 and audio portion 103.1), or to some intermediate portion within the skipped audio video portion (e.g., video portion 102.500 and audio portion 103.500). For example, if the skipped portion was an advertisement for a particular automobile brand, and the substitute video portion 207 or substitute audio portion 206 presented a summary or brief indication of the content of the advertisement, a user may be prompted to view the advertisement in response to the substitute video or audio. In such a circumstance, the user could request to view the advertisement in its entirety (or a portion thereof) at the normal playback, or at a different playback rate according one of the other embodiments (e.g., a 2× playback rate).

Other embodiments may include a combination of the substitute audio presented in audiovisual content 201.1, 201.2, 201.3, and 201.4. For example, audiovisual content at a negative 2× rate may include substitute audio created according to a combination of the methods of creating substitute audio 203.1 through 203.3 and substitute audio 205.1 through 205.6. As another example, audiovisual content at a negative 30 seconds skip video rate may include substitute audio that is created according to methods for creating substitute audio 205.1 through 205.6 and substitute audio 206.

In addition to the substitute audio being played back at a 1× playback rate as discussed above with respect to 201.1, 201.2, 201.3, and 201.4, in other embodiments, the substitute audio may include audio at more or less than a 1× playback rate. For example, as further discussed below, audiovisual content 201.1 may include video at a 2× playback rate and audio at a 1.2× playback rate, and audio visual content 201.2 may include video at a ½× playback rate and audio at a 0.8× playback rate.

Figure 3:
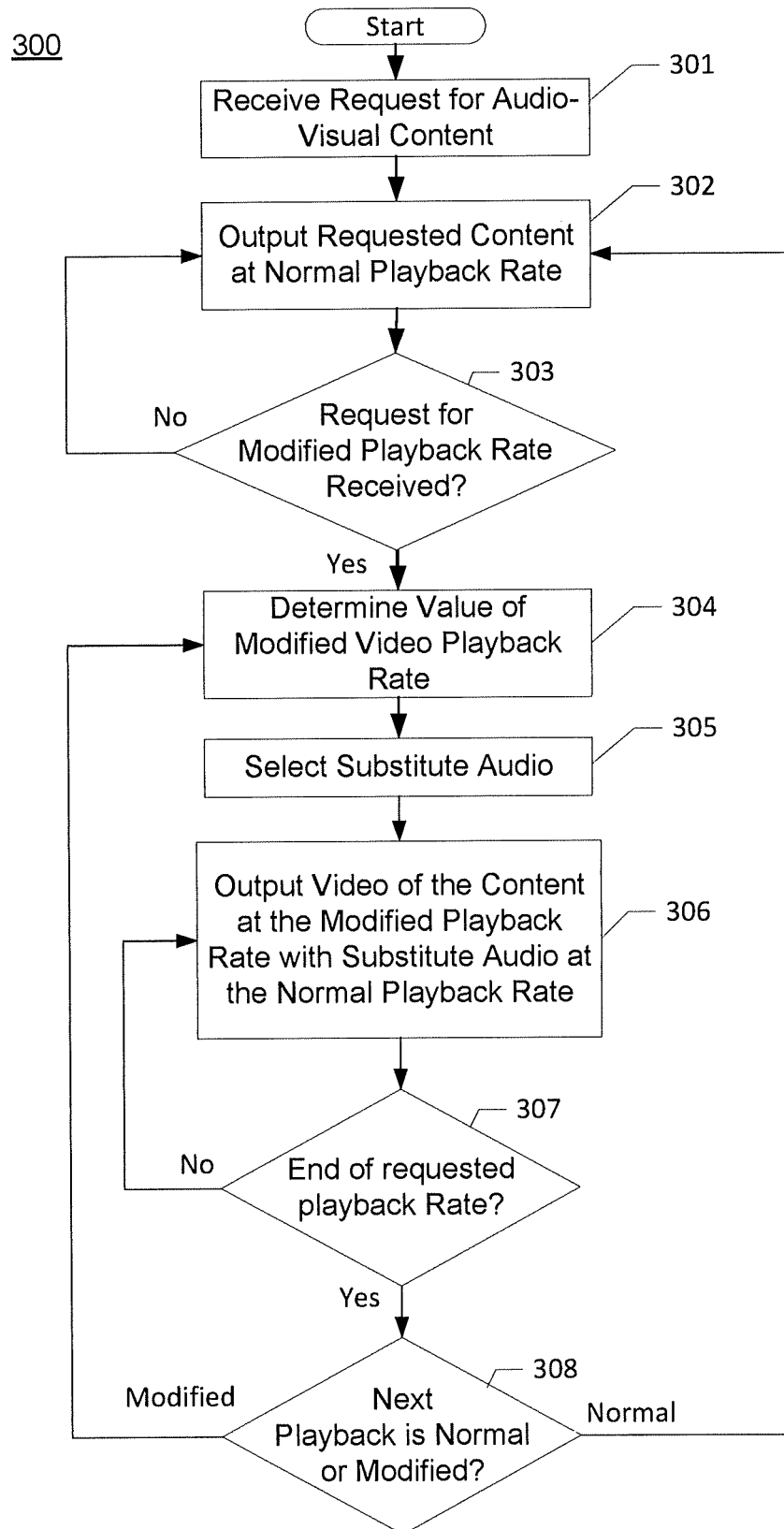
FIGS. 3 and 4 illustrate a flow diagram according to one or more embodiments.

FIG. 3 illustrates a flow diagram of a process 300 according to one or more embodiments for presenting audiovisual content at an adjusted/modified playback rate with substitute audio replacing (or modifying) the original audio of the audiovisual content. The process may optionally start in step 301 in which a computing device receives a request for audio visual content. In various examples, the request may be a user (e.g., viewer) request to present audiovisual content or may be an automated request from the computing device to a remote device for retrieving the audiovisual content. The computing device, in various examples, maybe a presentation device such as a television, a personal computer, a tablet, a smart phone, a set top terminal, a kiosk, digital video recorder or any other computing device capable of displaying the audiovisual content on a display or outputting the audiovisual content to a device with a display. In various other examples, the computing device may be a server, such as a video-on-demand server, a cloud or server-based digital video recorder, a streaming server, or any other server capable of transmitting (e.g., streaming) the audiovisual content to one or more remote terminals/premises for display.

In step 302, in response to the request for the audiovisual content, the computing device outputs the audiovisual content for display at a normal playback rate (e.g., as predetermined by the content creator and/or provider). Step 302 may include retrieving the content from a remote storage device, such as a remote database or streaming server. Outputting the audiovisual content may include, for example, transmitting the audiovisual content in an uncompressed format (e.g., pixel data, component or composite video) to a display device with analog audio to a stereo or speakers, as encoded audiovisual data (e.g., MPEG 2 or MPEG 4) to an audiovisual decoder, transmitting the audiovisual content over one or more networks (e.g., hybrid fiber coaxial network, a fiber-optic network, cellular network, satellite network, Wi-Fi, etc.) as a data stream, displaying the audiovisual content on a display, or combinations thereof.

In step 303, which may be a starting point for the method, the computing device may receive a request to modify the playback rate of the audiovisual content. If the computing device does not receive such a request, the process returns to step 302 to continue outputting the audiovisual content at the normal playback rate. If the computing place does receive such a request, the process proceeds to step 304, in which the computing device determines an attribute, such as a value of the modified playback rate. The value may be included in the request or maybe one of a plurality of predetermined playback values or rates stored or available in the computing device and referenced by the request. Playback values may indicate playback of the audiovisual content in the forward direction (e.g., a positive playback value) or may indicate playback of the audiovisual content in the reverse direction (e.g., a negative playback value). The playback values, for example, may indicate: one of a plurality of playback rates that are slower than the normal playback rate (e.g., playback value that are less than one, such as ¼× or ½×), one of a plurality of playback rates that are faster than the normal playback rate (e.g., playback values that are greater than one, such as 2×, 3×, 4×, 8×), the normal playback rate (e.g., a playback value equal to one), or a skip playback rate indicating a number of frames or a duration of the audiovisual content to skip (e.g., 900 frames, 30 seconds, etc.).

After the attribute, e.g., value, of the modified playback rate is determined, substitute audio is selected in step 305 to replace or modify the original audio portions associated with the video portions affected by the modified playback rate as, for example, in FIGS. 2A and 2B. The substitute audio may be selected from (or existing audio may be modified to be similar to) a plurality of substitute audios based upon the value of the modified playback rate. For example, a modified playback rate value of positive two, indicating a 2× playback rate may lead to a selection of substitute audio that is half the duration of the original audio portions being replaced (e.g., audiovisual content 201.1). As another example, a 2× playback rate may least to a selection of substitute audio that is sixty percent of the duration of the original audio but played back at a 1.2× rate to produce a final half duration audio. As another example, a modified playback rate value of positive 30 seconds, indicating a skip forward of 30 seconds, may select substitute audio of a shorter duration (e.g., 1 second, 5 second, etc.) that provides a brief summary of the audiovisual content that is being skipped. For example, if the skipped portion is a commercial advertisement skipped during a regular transmission, the substitute audio may include a shorter-duration, audio-only advertisement related to the product presented in the full audiovisual commercial advertisement.

The substitute audio may be selected not only based on the type of modified playback rate (e.g., fast forward, fast reverse, skip forward, skip reverse), but also based on the magnitude of the value (e.g., magnitude) of the modified playback rate. For example a longer skipped duration may result in the selection of a respectively longer substitute audio, or a faster playback rate may result in the selection of respectively shorter substitute audio that includes less information. Different algorithms of generating different types of substitute audio are further discussed below with respect to FIG. 4.

After the selection of the substitute audio in step 305, output of the audiovisual content is switched in step 306 to outputting subsequent video portions at the modified playback rate with the selected substitute audio at the normal playback rate. In various examples the substitute audio is output contemporaneously with the video portion to which it is associated. This may include synchronization of each substitute audio portion with its associated video portion. For example a video portion that presents a speaker may be synchronized (e.g., lip synchronized) with the associated substitute audio portion. The substitute audio portions may be generated such that they present the same or similar information as the original audio portions that they replace but in a shorter or longer duration as determined by the modified playback rate. In various examples, the substitute audio is not merely the original audio output at a faster or slower rate, but is audio that can be played back rate at the normal rate, but with more or less information. This may include, for example, removing pauses in dialogue, replacing spoken words with longer or shorter synonymous words, removing one or more play tracks of the original audio, replacing audio content with a summary of the audio content, or other modifications as further discussed with respect to FIG. 4. Various embodiments may include video and audio timestamps from the original video and audio at the normal playback rate maintained (e.g., at regular increments of playback time) with the video at the modified playback rate and with the substitute audio, so that synchronization (e.g., lip sync) may be periodically corrected.

In step 307, the computing device may determine if the modified playback rate is to end. The determination could be based on the modified playback rate being only for a predetermined limited duration (e.g., the end of the skip rate, a momentary fast-forward for a fixed duration, etc.) or may be based on receiving a request for a new playback rate. If step 307 determines that the modified playback rate should continue (the "no" branch), the process returns to step 306 to output the video at the modified playback rate with the substitute audio at the normal playback rate. If the determination is made that the modified playback rate should end (e.g., a request for a new playback rate is received, a skip completed, etc.) (the "yes" branch), then it is determined in step 308 whether the next playback rate as a normal playback rate or another modified playback rate. If the next playback rate is a normal playback rate, such as when a skip is completed or when a normal playback rate is requested, the process returns to step 302 in which the audiovisual content is played back at the normal playback rate with the original audio. If the next playback rate is another modified playback rate, the process returns to step 304 where the value of the new modified playback rate is determined. The next playback rate in step 308 may result from a new request for a modified playback rate or may, for example, be preprogramed to follow the previously requested playback rate. For example, if the present rate is 4×, but the previous rate was 2×, step 308 may return playback to the previous 2× rate in step 304, rather than the 1× rate in step 302. The process continues until a request is received to stop playback altogether or the output of the end of the audiovisual content is reached.

In various examples, the requests for different playback rates in steps 303 and 308, and the determination in step 307 whether to end the current playback rate may be based autonomously on and be performed in response to the complexity of the audiovisual content being played back. For example, as content is being played back (at whatever playback rate is currently selected), changes in the complexity of the content may be determined in step 307, and if the complexity of the content changes, the playback rate may be modified in step 308. For example, if the complexity of the content increases, the playback rate may be decreased (e.g., from 4× to 2×, 8× to 3×, etc.) to make the content more comprehensible to the viewer, and if the complexity of the content decreases, the playback rate may be increased (e.g., from 2× to 4×, 1.2× to 3×, etc.), because the content is comprehensible at the increased playback rate.

In various additional examples, the playback rate of the video is not adjusted based on a changing complexity, but the selection of the substitute audio in step 305 is based on the complexity of the audiovisual content. As such, the substitute audio may be selected (as discussed with respect to FIG. 4) based on both a playback rate of the video that is selected, the complexity of the video, the complexity of the original audio, or combinations thereof.

Complexity of the audiovisual content may be determined in various ways, including measuring the amount of motion or change of video content (e.g., imagery) from video frame to video frame, measuring the amount of audio variation in the original audio, counting the number of words, syllables, or inflections in speech in the audio (e.g., as reflected in closed caption), etc.

Figure 4:
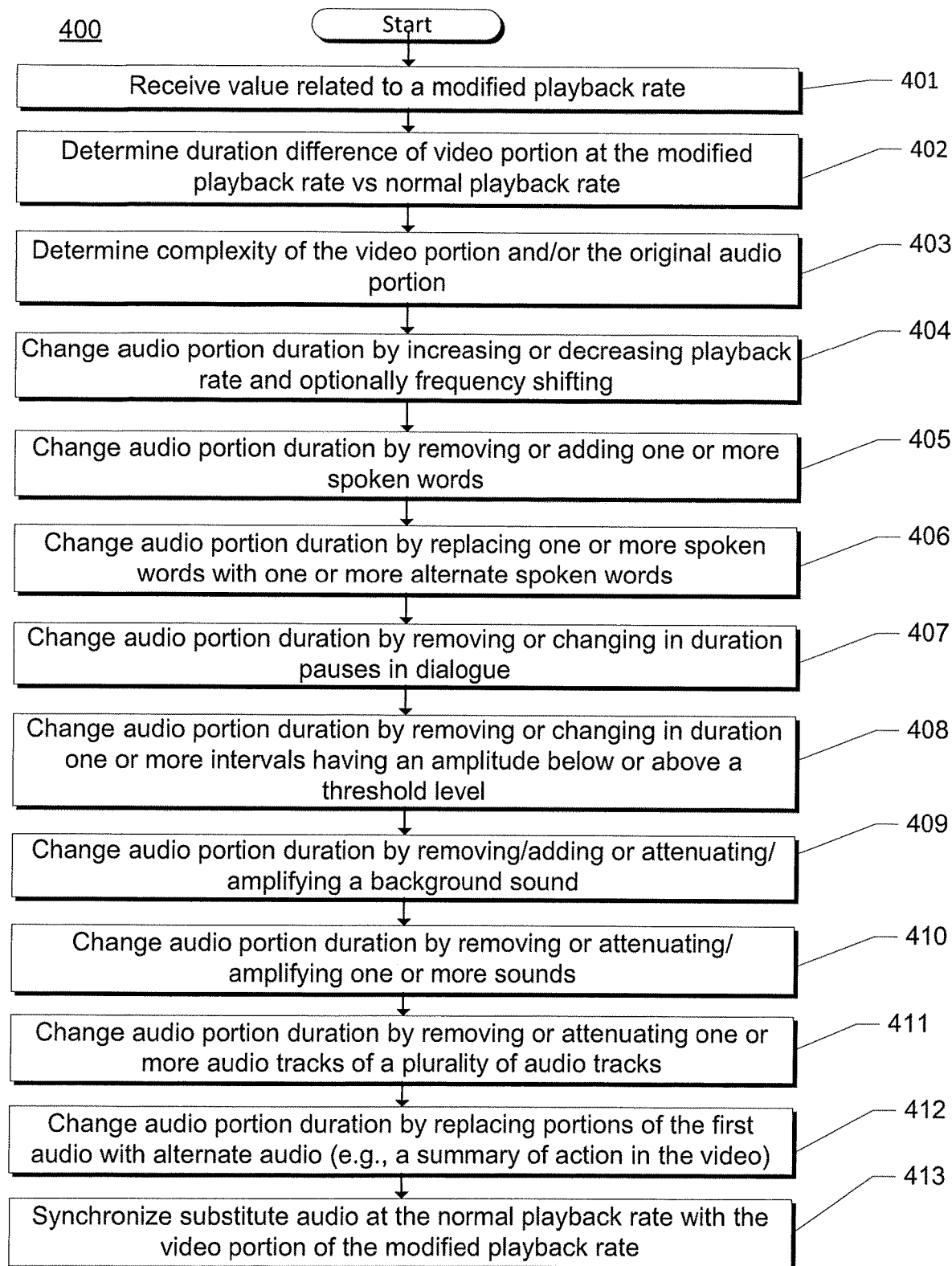

As previously discussed there may be a plurality of different substitute audios for the same video portion depending upon the modified playback rate. FIG. 4 illustrates example process 400 for generating various substitute audios for a particular associated video portion. The process begins in step 401 when an attribute, e.g., a value related to the modified playback rate of a particular video portion is received for which the substitute audio is to be generated. In step 402, a difference in duration between the playback time of the video portion at the modified playback rate and the playback time of the video portion at the normal playback rate is determined. The difference in duration may be measured in time (e.g., fractions of a second), in the terms of a ratio or percentage of the normal playback time (e.g., 0.5, ¼, 110%), in the number of frames, in fractions of frames, etc.

In step 403, a complexity of the video portion and/or the original audio portion to be replaced is analyzed. This may include analyzing the subject matter depicted in the video portion. Based on the difference in duration determined in step 402 and a complexity of the video portion and/or original audio portion determined in step 403, the substitute audio portion is generated using one or more techniques of steps 404 through 412. For example, if the video portion does not include any dialogue of speakers, modification to the audio that affects dialogue may be skipped. In another example, if the video portion includes dialogue from a narrator only that is not depicted in the video portion, modification that does not concern synchronization may be chosen (e.g., step 412 described below.) In a further example, as the modified playback rate increases, certain aspects described below may become less effective earlier for content that is more complex and that includes more information. The complexity of the audiovisual portion may be determined as discussed above with respect to FIG. 3.

In step 404, the original audio portion playback rate maybe increased or decreased in proportion to the playback rate of the video. As discussed above, such an increase or decrease in audio playback rate will result in a respective increase or decrease in the pitch of the audio. To account for the pitch shift, the accelerated or decelerated audio can be pitch shifted down or up, respectively, so that the accelerated or decelerated audio is adjusted back to the pitch of the original audio. Step 404 may be used as a first step or partial step (or may be skipped) in adjusting the audio to correspond to the modified video. For example, if the video is played back at a 2× rate, step 404 may adjust the audio to a 1.2× rate, so that the remainder of 400 (e.g., 404-413) need only account a 1.67× adjustment (e.g., 1.2××1.67×=2×). As another example, if the video is played back at a 0.5× rate, step 404 may adjust the audio to a 0.8× rate, so that the remainder of 400 (e.g., 404-413) need only account for a 0.63× adjustment (e.g., 0.8××0.63×=0.5×).

In step 405, for example, the original audio portion may be changed to generate the substitute audio by removing or adding one or more spoken words. For example, in a dialogue spoken in the original audio portion, words that do not convey substantive information or convey less important information (e.g., "the," "a," etc.) relative to the understanding of the dialogue may be deleted to shorten the duration of the substitute audio. Likewise, filler words adding little substantive information or adding additional information about the associated video portion can be added to lengthen the duration of the substitute audio.

In step 406, the original audio portion may be changed to generate the substitute audio by replacing one or more spoken words with one or more alternative spoken words or sounds conveying the same or similar information. For example, to shorten the duration of the substitute audio one or more longer words can be replaced with one or more synonymous shorter words, and to lengthen the duration of the substitute audio one or more shorter words can be replaced with one or more synonymous longer words. For each spoken word, a library database of audio with substitute words may be maintained and searched during the process of replacing the words. The library may be generated, for example, by each original speaker recording the substitute words separate from the original audio. Alternatively or additionally, the library may be generated autonomously based on a thesaurus database of synonymous words, and artificial synthesis of the articulated synonymous word such that the pitch, inflections, and other manners in which the speaker enunciates words is matched according to a voice profile of the speaker. The profile may be based on analysis of the speaker's voice in the video or based on analysis of the speaker's voice from a separate recording.

In another aspect of step 406, the speaker may similarly record different substitute audios replacing the original audio portions, respectively, for different playback rates. For example, one or more speakers may record different dialogues conveying the same or similar information as the original audio portion but in different durations as determined by the modified playback rate.

In step 407, the original audio portion may be changed to generate the substitute audio by removing or changing durations of pauses in dialogue or other silent intervals within the original audio portion. For example, intervals between spoken words from a speaker can be shortened such that the overall length of the dialogue is shortened while the distinction between each word is sufficiently maintained.

Similarly, intervals between spoken words from one or more speakers can be lengthened to increase the overall length of the dialogue.

In step 408, the original audio portion may be changed to generate the substitute audio by removing or changing in duration one or more intervals having an audio amplitude below or above a threshold value. For example, intervals of an audio portion in which no dialogue occurs, but is filled with background noise (e.g., wind blowing), may be removed or reduced in duration based on the background noise being below a threshold value. Similarly, intervals of an audio portion in which no dialogue occurs but is filled with loud background noise (e.g., a waterfall, crowds cheering, etc.), may be lengthened or duplicated based on the background noise being above a threshold value to extend the length of substitute audio.

In step 409, the original audio portion may be changed to generate the substitute audio by removing or adding or attenuating or amplifying a background sound. Step 409 differs from step 408 in that the background sound is not lengthened or shortened, but instead, its amplitude is altered so that other aspects of the audio portion that have been changed (e.g., dialogue changed, pauses added or removed, etc.) are augmented by the altered background sound. For example, background sounds may be reduced so dialogue that has been shortened is clearer and more easily discernible to the listener. As another example, background sounds may be added to fill in pauses in dialogue or other silent portions that have been lengthened.

In step 410, the original audio portion may be changed to generate the substitute audio by removing, attenuating, or amplifying one or more other sounds. For example if multiple persons are speaking in the video portion, the dialogue from all but one of the persons may be attenuated or removed so that the one remaining dialogue is clearer and more easily discernible to the listener. In step 411, the original audio portion may comprise a plurality of audio tracks, and one or more of the plurality of audio tracks may be removed, attenuated, or amplified. For example, each source of audio within an audio portion (e.g., multiple speakers, background waterfall noise, each member of an orchestra, etc.) may be recorded on a separate audio track. To make a particular one of the audio tracks more clear and discernible, other ones of the plurality of audio tracks may be attenuated or removed altogether. Alternatively or additionally, the particular one of the audio tracks may be amplified above the remaining ones of the plurality of audio tracks to make the amplified track more clear and discernible. Similar to step 409, steps 410 and 411 may be used to improve the clarity of other aspects of the audio portion that have been changed in duration.

In step 412, the substitute audio may be generated by replacing intervals of the original audio portion with an entirely different audio portion, such as for example, a summary of the action in the video or a summary of the information conveyed in the original audio. For example, if the difference in duration determined in step 402 is sufficiently shortened (by a skip play or high fast forward rate) and/or the video portion or original audio portion is of significant complexity that steps 404 through 411 are not adequate enough to reduce the length the substitute audio while conveying sufficient information to make the video at the modified playback rate understandable, a brief summary may be inserted that explains what is occurring in the video portion during the duration of the playback at the modified rate. Step 412 may include, for negative video playback rates, generating substitute audio at the normal forward playback rate that explains the content of the video while the video progresses backwards.

In step 413, the substitute audio at the normal or modified playback rate (e.g., 1×, 1.2×) generated according to the previous steps is synchronized to the associated video at the modified playback rate. For example, spoken words may be shifted to start earlier or later to align with the movement of a speaker's lips in the video closer to when the speaker is enunciating the shifted word (e.g., lip synchronization). In another aspect, certain words may be compressed and other words expanded in duration so that the words are synchronized to the changed rate of lip movement of one or more speakers. In circumstances where the dialogue is expanded or compressed, the dialogue may be pitch shifted up or down, respectively, so that he expanded or compressed words are presented at the same pitch as when the words are output at the normal playback rate (as in step 404).

Shifting spoken words in step 413 may also be done to simply extend the amount of time available to play back of the audio content. For example, by starting the audio playback 500 ms early and ending the audio playback 500 ms late, the audio is increased in duration, and thus can be compressed less (e.g., 1.3×) than an increase in playback rate of the video (e.g., 1.5×) to fit within the same duration.

In other aspects of step 413, the video portion at the modified playback rate may be altered to synchronize motion imaged in the video portion with sounds in the associated substitute audio. For example, lip movement of a speaker may be altered such that the video portion is lip synchronized to modified dialogue in the substitute audio. Altering the video portion may include separately recording a scene in the video portion with different movements such that the movements are synchronized to the modified dialogue (e.g., filming a scene 10 times with actors saying shortened or elongated lines or speaking at different speeds). In other aspects, altering the video portion may include modifying autonomously the original video portion (e.g., alter lip movement of a live person or an animated character) using synthetic video manipulation techniques (e.g., MPEG-4 Face and Body Animation).

At the end of process 400, one or more substitute audios may be stored on the computing device or at a remote storage device for use in process 300 of FIG. 3. Alternatively, the process 400 may be performed in real-time to generate substitute audio when a request in process 300 is received for adjusting the playback rate.

As one example of generating substitute audio according to the process 400, the original audio may be modified by first removing background sounds so that, for example, dialogue of one or more speakers can be clearly distinguished. The dialogue with the background sounds removed can then be compressed or expanded according to an increased or decreased playback rate to fit within the changed duration of the modified video playback time. Changing the audio playback rate of the dialogue has the effect of changing the pitch of the audio. To account for the change in pitch, the audio at the modified playback rate may be pitch-shifted back to the pitch of the dialogue at the normal playback rate.

In various examples, processes 300 and 400 may be used together so a video portion with modified playback at sequentially increasing rates (e.g., 1.5×, 2×, 4×, 8×, 16×, etc.) are respectively associated with substitute audios having a sequentially increasing amount of modification. For example, at a 1.5× fast forward rate, the playback rate of the audio may be slightly increased and optionally pitch shifted (e.g., 1.2× faster) as in step 404, and pauses in the dialogue may be removed as in step 407 words in a dialogue may simply be removed as in step 404. As the playback rate increases to 2×, unnecessary words in the dialogue may be removed as in step 405 in addition or in place of steps 404 and/or 407 and pauses in the dialogue may be shortened as in step 406. As the playback rate further increases to 4×, steps 405, 406, 407, or combinations thereof may be performed in addition to substitution of longer words with synonymous shorter words according to step 406, or by additionally applying steps 408-411. As the playback rate further increases to above 4×, the original audio may not maintainable in a comprehensible form when modified according to the techniques in process 400, so instead, the original audio portion may be replaced with a summary is in step 412. As illustrated by this example, the order of the steps in 400 need not be the order in which they are applied as video is increased or decreased at incrementally faster or slower playback speeds.

Figure 5:
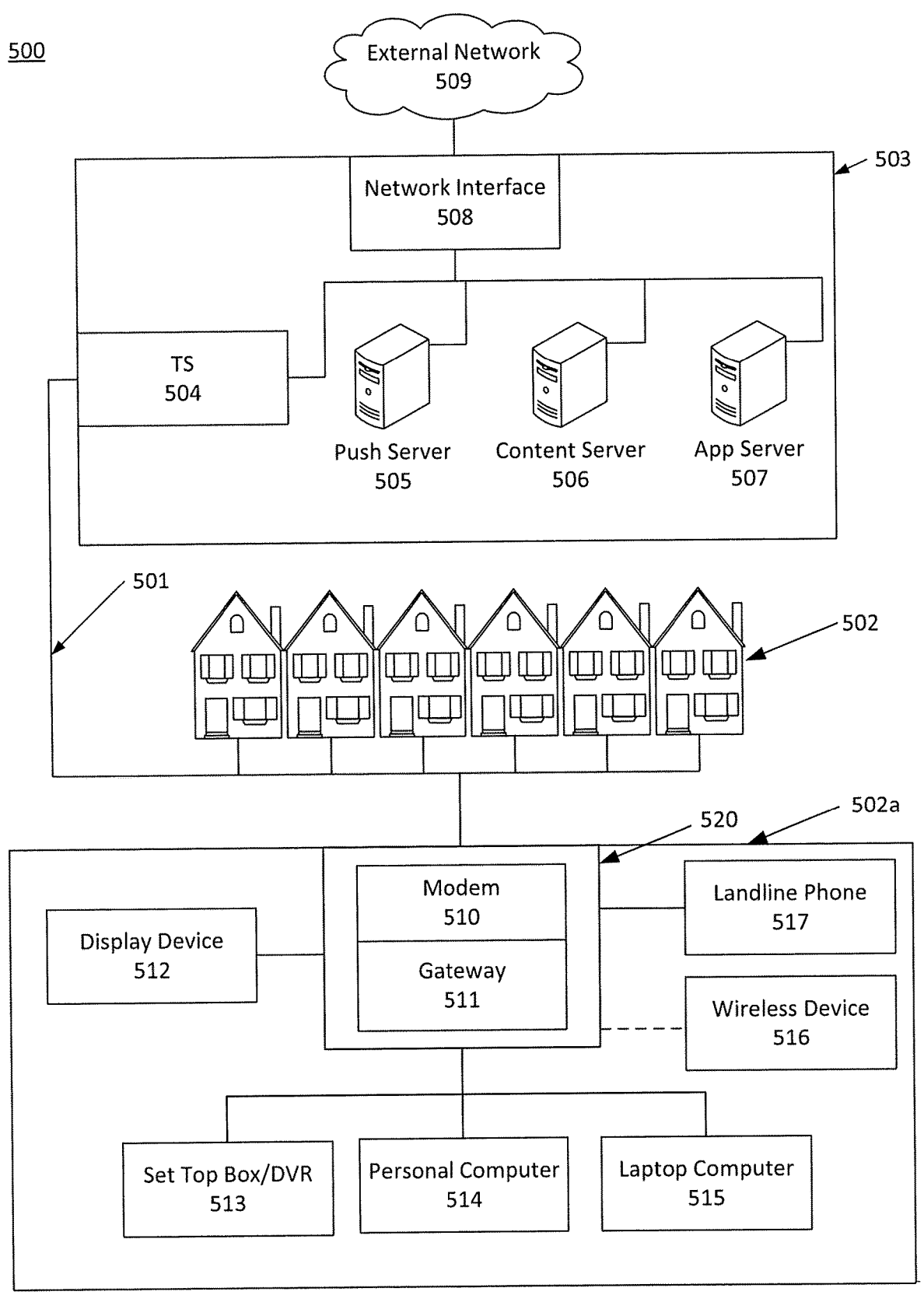
FIG. 5 illustrates an example communication network on which one or more embodiments may be implemented.

FIG. 5 illustrates an example communication network 500 on which many of the various features described herein may be implemented. Network 500 may be any type of information distribution network, such as satellite, telephone, cellular, wireless, etc. One example may be an optical fiber network, a coaxial cable network, or a hybrid fiber/coax distribution network. Such networks 500 use a series of interconnected communication links 501 (e.g., coaxial cables, optical fibers, wireless, etc.) to connect multiple premises 502 (e.g., businesses, homes, consumer dwellings, etc.) to a distribution point such as local office or headend 503. The local office 503 may transmit downstream information signals including audiovisual content with original audio and one or more substitute audios at one or more playback rates onto the links 501, and each premise 502 may have a receiver used to receive and process those signals including the audiovisual content.

There may be one link 501 originating from the local office 503, and it may be split a number of times to distribute the signal to various premises 502 in the vicinity (which may be many miles) of the local office 503. The links 501 may include components not illustrated, such as splitters, filters, amplifiers, etc. to distribute the signal. Portions of the links 501 may also be implemented with fiber-optic cable, while other portions may be implemented with coaxial cable, other lines, or wireless communication paths.

The local office 503 may include an interface, such as a termination system (TS) 504. More specifically, the interface 504 may be a cable modem termination system (CMTS), which may be a computing device configured to manage communications between devices on the network of links 501 and backend devices such as servers 505-507 (to be discussed further below). The interface 504 may be as specified in a standard, such as the Data Over Cable Service Interface Specification (DOCSIS) standard, published by Cable Television Laboratories, Inc. (a.k.a. CableLabs), or it may be a similar or modified device instead. The interface 504 may be configured to place data on one or more downstream frequencies to be received by modems at the various premises 502, and to receive upstream communications from those modems on one or more upstream frequencies.

The local office 503 may also include one or more network interfaces 508, which can permit the local office 503 to communicate with various other external networks 509. These networks 509 may include, for example, networks of Internet devices, telephone networks, cellular telephone networks, fiber optic networks, local wireless networks (e.g., WiMAx), satellite networks, and any other desired network, and the network interface 508 may include the corresponding circuitry needed to communicate on the external networks 509, and to other devices on the network such as a cellular telephone network and its corresponding cell phones.

As noted above, the local office 503 may include a variety of servers 505-507 that may be configured to perform various functions. For example, the local office 503 may include a push notification server 505. The push notification server 505 may generate push notifications to deliver data and/or commands to the various premises 502 in the network (or more specifically, to the devices in the premises 502 that are configured to detect such notifications). The local office 503 may also include a content server 506. The content server 506 may be one or more computing devices that are configured to provide audiovisual content to users at their premises. This audiovisual content may be, for example, video on demand movies, television programs, video games, etc. The content server 506 may include software to validate user identities and entitlements, to locate and retrieve requested audiovisual content, to encrypt the content, and to initiate delivery (e.g., streaming) of the content to the requesting user(s) and/or device(s).

The local office 503 may also include one or more application servers 507. An application server 507 may be a computing device configured to offer any desired service, and may run various languages and operating systems (e.g., servlets and JSP pages running on Tomcat/MySQL, OSx, BSD, Ubuntu, Redhat, HTML5, JavaScript, AJAx and COMET). For example, an application server may be responsible for generating the substitute audio based on modified playback rates of audiovisual content. Yet another application server may be responsible for formatting and inserting the substitute audio into the audiovisual content stream being transmitted to the premises 502. The application server may further be responsible for forwarding the substitute audio to the premises 502 separately from the audiovisual content for later insertion. Although shown separately, one of ordinary skill in the art will appreciate that the push server 505, content server 506, and application server 507 may be combined. Further, here the push server 505, content server 506, and application server 507 are shown generally, and it will be understood that they may each contain memory storing computer executable instructions to cause a processor to perform steps described herein and/or memory for storing data (e.g., a library of substitute words).

An example premise 502*a*, such as a home, may include an interface 520. The interface 520 can include any communication circuitry needed to allow a device to communicate on one or more links 501 with other devices in the network. For example, the interface 520 may include a modem 510, which may include transmitters and receivers used to communicate on the links 501 and with the local office 503. The modem 510 may be, for example, a coaxial cable modem (for coaxial cable lines 501), a fiber interface node (for fiber optic lines 501), twisted-pair telephone modem, cellular telephone transceiver, satellite transceiver, local wi-fi router or access point, or any other desired modem device. Also, although only one modem is shown in FIG. 5, a plurality of modems operating in parallel may be implemented within the interface 520. Further, the interface 520 may include a gateway interface device 511. The modem 510 may be connected to, or be a part of, the gateway interface device 511. The gateway interface device 511 may be a computing device that communicates with the modem(s) 510 to allow one or more other devices in the premises 502a, to communicate with the local office 503 and other devices beyond the local office 503. The gateway 511 may be a set-top box (STB), digital video recorder (DVR), computer server, personal computer or any other desired computing device. The gateway 511 may also include (not shown) local network interfaces to provide communication signals to requesting entities/computing devices in the premises 502a, such as display devices 512 (e.g., televisions), additional STBs or DVRs 513, personal computers 514, laptop computers 515, wireless devices 516 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 517 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others. Processes 300 and 400 may be performed any number of computing devices (e.g., 505, 506, 507, 511-516, etc.) individually or in combination in the FIG. 1 architecture.

Figure 6:
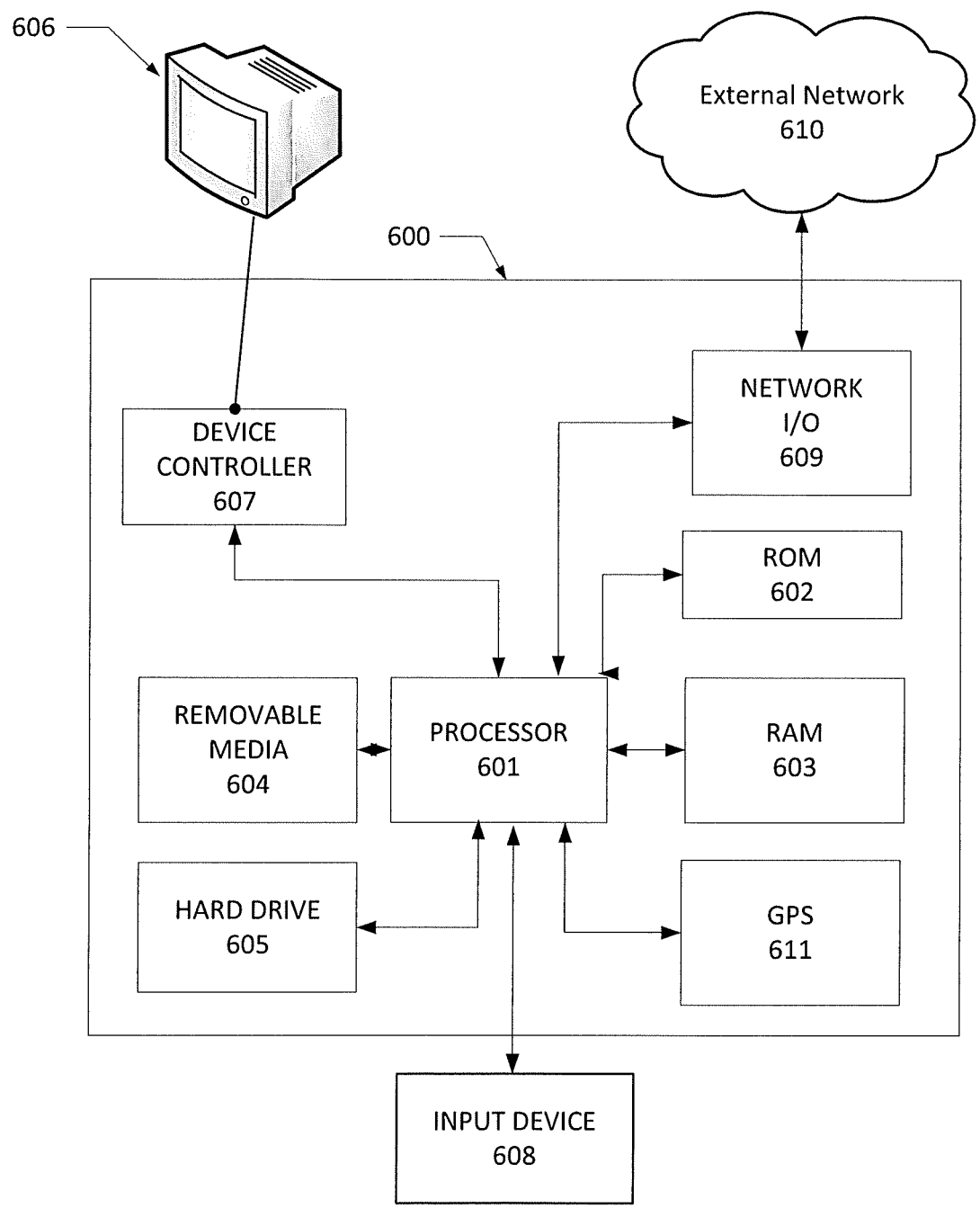
FIG. 6 illustrates hardware elements of various computing devices according to one or more embodiments.

FIG. 6 illustrates general hardware elements that can be used to implement any of the various computing devices discussed herein. The computing device 600 may include one or more processors 601, which may execute instructions of a computer program to perform any of the features described herein. The instructions may be stored in any type of computer-readable medium or memory, to configure the operation of the processor 601. For example, instructions may be stored in a read-only memory (ROM) 602, random access memory (RAM) 603, removable media 604, such as a Universal Serial Bus (USB) drive, compact disk (CD) or digital versatile disk (DVD), floppy disk drive, or any other desired storage medium. Instructions may also be stored in an attached (or internal) hard drive 605. The computing device 600 may include one or more output devices, such as a display 606 (e.g., an external television, monitor, touchscreen), and may include one or more output device controllers 607, such as a video processor. There may also be one or more user input devices 608, such as a remote control, keyboard, mouse, touch screen, microphone, etc. The computing device 600 may also include one or more network interfaces, such as a network input/output (I/O) circuit 609 (e.g., a network card) to communicate with an external network 610. The network input/output circuit 609 may be a wired interface, wireless interface, or a combination of the two. In some embodiments, the network input/output circuit 609 may include a modem (e.g., a cable modem), and the external network 610 may include the communication links 501 discussed above, the external network 509, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 611, which can be configured to receive and process global positioning signals and determine, with possible assistance from an external server and antenna, a geographic position of the device.

The FIG. 6 example is a hardware configuration, although the illustrated components may be implemented as software as well. Modifications may be made to add, remove, combine, divide, etc. components of the computing device 600 as desired. Additionally, the components illustrated may be implemented using basic computing devices and components, and the same components (e.g., processor 601, ROM storage 602, display 606, etc.) may be used to implement any of the other computing devices and components described herein. For example, the various components herein may be implemented using computing devices having components such as a processor executing computer-executable instructions stored on a computer-readable medium, as illustrated in FIG. 6. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

To provide a better user experience, it may be desirable for a system such as a content delivery system or device such as a content consumption device to be able to identify which user(s) are in the room and customize settings, profiles, or preferences to be specific to the user(s) such as an active user or a group of identified users. Profiles, settings, or preferences may be customized based on the user who is in control of a remote control device or the group of users present in the viewing area or field of view of an image device. Determination of the user in control of the remote control device may be ascertained from analysis of an image captured at the time of a signal transmission from the remote control device. A computing device may be used to process a captured image and determine an associated user for the control signal. A user may be associated with the remote control device based on relative positions of the user and the remote control device, and the user in control of the remote control device may be identified as the active user.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A system comprising:
a first computing device and a second computing device;
wherein the first computing device comprises:
one or more first processors; and
first memory storing first instructions that, when executed by the one or more first processors, cause the first computing device to:
provide a video portion of audio-visual content at a modified playback rate different from a first playback rate of the video portion;
determine, based on a duration of the video portion at the modified playback rate, an alternative audio to be output at the first playback rate; and
provide, with the video portion at the modified playback rate, the alternative audio at the first playback rate; and
wherein the second computing device comprises:
one or more second processors; and
second memory storing second instructions that, when executed by the one or more second processors, cause the second computing device to store the audio-visual content.

2. The system of claim 1, wherein the alternative audio comprises an altered version of an audio portion of the audio-visual content.

3. The system of claim 1, wherein the first instructions, when executed by the one or more first processors, further cause the first computing device to synchronize sounds of the alternative audio with action in the video portion of the audio-visual content at the modified playback rate.

4. The system of claim 1, wherein the first instructions, when executed by the one or more first processors, further cause the first computing device to determine the alternative audio to be output at the first playback rate by selecting, based on the duration of the video portion at the modified playback rate, the alternative audio from a plurality of alternative audios, wherein a duration of the alternative audio at the first playback rate corresponds to the duration of the video portion at the modified playback rate.

5. The system of claim 1, wherein the first instructions, when executed by the one or more first processors, further cause the first computing device to adjust a duration of the alternative audio at the first playback rate to the duration of the video portion at the modified playback rate.

6. The system of claim 1, wherein the alternative audio replaces an audio portion of the audio-visual content.

7. The system of claim 1, wherein the first instructions, when executed by the one or more first processors, further cause the first computing device to modify sounds in the alternative audio at the first playback rate to synchronize with lip movement of a person imaged in the video portion.

8. One or more non-transitory computer-readable media storing instructions that, when executed, cause:
providing a video portion of audio-visual content at a modified playback rate different from a first playback rate of the video portion;
determining, based on a duration of the video portion at the modified playback rate, an alternative audio to be output at the first playback rate; and
providing, with the video portion at the modified playback rate, the alternative audio at the first playback rate.

9. The one or more non-transitory computer-readable media of claim 8, wherein the alternative audio comprises an altered version of an audio portion of the audio-visual content.

10. The one or more non-transitory computer-readable media of claim 8, wherein the instructions, when executed, further cause synchronizing sounds of the alternative audio with action in the video portion of the audio-visual content at the modified playback rate.

11. The one or more non-transitory computer-readable media of claim 8, wherein the instructions, when executed, cause the determining by causing selecting, based on the duration of the video portion at the modified playback rate, the alternative audio from a plurality of alternative audios, and wherein a duration of the alternative audio at the first playback rate corresponds to the duration of the video portion at the modified playback rate.

12. The one or more non-transitory computer-readable media of claim 8, wherein the instructions, when executed, further cause adjusting a duration of the alternative audio at the first playback rate to the duration of the video portion at the modified playback rate.

13. The one or more non-transitory computer-readable media of claim 8, wherein the alternative audio replaces an audio portion of the audio-visual content.

14. The one or more non-transitory computer-readable media of claim 8, wherein the instructions, when executed, further cause modifying sounds in the alternative audio at the first playback rate to synchronize with lip movement of a person imaged in the video portion.

15. A system comprising:
a first computing device and a second computing device;
wherein the first computing device comprises:
one or more first processors; and
first memory storing first instructions that, when executed by the one or more first processors, cause the first computing device to:
determine a video portion, wherein the video portion is to be output at a modified playback rate that is different from a first playback rate of the video portion;
modify, based on the first playback rate and a duration of the video portion to be output at the modified playback rate, an audio portion corresponding to the video portion; and
cause output of the video portion at the modified playback rate and output of the modified audio portion at the first playback rate; and
wherein the second computing device comprises:
one or more second processors; and
second memory storing second instructions that, when executed by the one or more second processors, cause the second computing device to store the video portion.

16. The system of claim 15, wherein the first instructions, when executed by the one or more first processors, further cause the first computing device to modify the audio portion corresponding to the video portion by adding, to the audio portion and based on the modified playback rate of the video portion, information.

17. The system of claim 15, wherein the first instructions, when executed by the one or more first processors, further cause the first computing device to modify the audio portion corresponding to the video portion by removing, from the audio portion and based on the modified playback rate of the video portion, information.

18. The system of claim 15, wherein the first instructions, when executed by the one or more first processors, further cause the first computing device to modify the audio portion corresponding to the video portion by:

replacing, in the audio portion and based on the modified playback rate of the video portion, spoken words with longer or shorter synonymous words, or replacing audio content with a summary of the audio content in the audio portion.

19. The system of claim 15, wherein a duration of the modified audio portion at the first playback rate corresponds to the duration of the video portion at the modified playback rate.

20. The system of claim 15, wherein the first instructions, when executed by the one or more first processors, further cause the first computing device to synchronize sounds of the modified audio portion with the video portion.

21. One or more non-transitory computer-readable media storing instructions that, when executed, cause:

determining a video portion, wherein the video portion is to be output at a modified playback rate that is different from a first playback rate of the video portion;

modifying, based on the first playback rate and a duration of the video portion to be output at the modified playback rate, an audio portion corresponding to the video portion; and causing output of the video portion at the modified playback rate and output of the modified audio portion at the first playback rate.

22. The one or more non-transitory computer-readable media of claim 21, wherein the instructions, when executed, cause the modifying by causing adding, to the audio portion and based on the modified playback rate of the video portion, information.

23. The one or more non-transitory computer-readable media of claim 21, wherein the instructions, when executed, cause the modifying by causing removing, from the audio portion and based on the modified playback rate of the video portion, information.

24. The one or more non-transitory computer-readable media of claim 21, wherein the instructions, when executed, cause the modifying by causing:

replacing, in the audio portion and based on the modified playback rate of the video portion, spoken words with longer or shorter synonymous words, or replacing audio content with a summary of the audio content in the audio portion.

25. The one or more non-transitory computer-readable media of claim 21, wherein a duration of the modified audio portion at the first playback rate corresponds to the duration of the video portion at the modified playback rate.

26. The one or more non-transitory computer-readable media of claim 21, wherein the instructions, when executed, further cause synchronizing sounds of the modified audio portion with the video portion.

* * * * *